United States Patent [19]
Raynaud et al.

[11] Patent Number: 5,102,475
[45] Date of Patent: Apr. 7, 1992

[54] PROCESS FOR OBTAINING LITHIUM-BASED THIN SHEETS AND ITS APPLICATION TO THE PRODUCTION OF NEGATIVE PLATES FOR ACCUMULATORS

[75] Inventors: Guy-Michel Raynaud, St. Egreve; Gilles Regazzoni; Gilles Nussbaum, both of Grenoble; Max Reboul, St. Egreve, all of France

[73] Assignee: Pechiney Recherche, Courbevoie, France

[21] Appl. No.: 592,838

[22] Filed: Oct. 4, 1990

[30] Foreign Application Priority Data
Oct. 30, 1989 [FR] France .................. 89 14726

[51] Int. Cl.$^5$ .................. C22F 1/02; C22C 24/00
[52] U.S. Cl. .................. 148/11.5 R; 148/11.5 M; 148/400; 420/400; 420/402
[58] Field of Search .................. 148/11.5 R, 11.5 M, 148/400; 420/400, 402

[56] References Cited

U.S. PATENT DOCUMENTS
2,605,297  7/1952  Dean .................. 420/402
2,692,213  10/1954  Dean .................. 420/402

FOREIGN PATENT DOCUMENTS
1103912  7/1984  U.S.S.R.

Primary Examiner—R. Dean
Assistant Examiner—Robert R. Koehler
Attorney, Agent, or Firm—Dennison, Meserole, Pollack & Scheiner

[57] ABSTRACT

A process for obtaining lithium-based thin sheets, generally used for the production of negative plates for accumulators. The thin sheets are formed by adding magnesium to a bath of molten lithium, transforming the alloy into a solid product in a form suitable for rolling, and rolling the solid product obtained by passing it between steel cylinders a plurality of times at ambient temperature to obtain thin sheets.

5 Claims, 1 Drawing Sheet

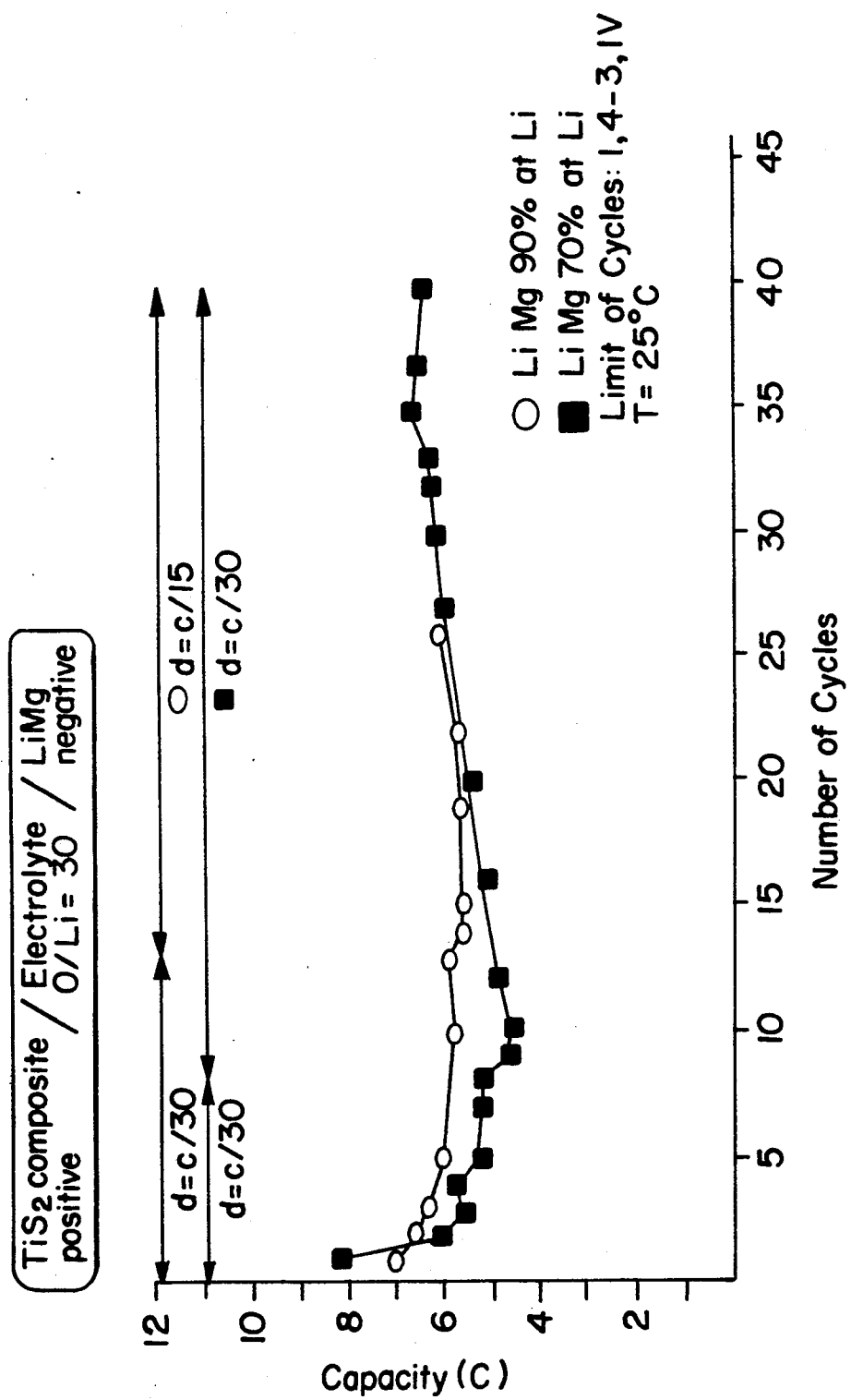

PROCESS FOR OBTAINING LITHIUM-BASED THIN SHEETS AND ITS APPLICATION TO THE PRODUCTION OF NEGATIVE PLATES FOR ACCUMULATORS

BACKGROUND OF THE INVENTION

The invention relates to a process for obtaining lithium-based thin sheets and its application to the production of negative plates for accumulators.

A person skilled in the art knows that lithium is a metal which, in addition to very high reactivity with damp air, has very poor mechanical properties and has a marked tendency to adhere to the majority of materials. These are all factors which make it difficult to obtain thin sheets of lithium by rolling, particularly if thicknesses of less than 200 $\mu$m are to be obtained. They can obviously be obtained by taking the precaution of working in an air atmosphere having a low moisture content or in a noble gas atmosphere, of multiplying the rolling passes and using non-stick devices during rolling and/or winding, but the transformation costs are therefore too high for certain potential applications of this material such as, for example, the production of negative plates provided in certain accumulators containing organic electrolyte.

It is therefore worthwhile and necessary to have suitable means for solving this problem of rollability of the lithium.

Solutions have obviously already been recommended. Thus, for example, in Russian author's certificate no. 1103912 there is described a process for rolling lithium involving rolling the lithium by means of cylinders cooled to a temperature below 0° C. which is characterised in that, to prevent adhesion of the lithium to the cylinders during rolling and to improve the quality of the sheets obtained, rolling is carried out under inert gas which has been dried to a dew point below the temperature of the working surface of the cylinders; the temperature of the working surface of the cylinders being maintained between −1° and −100° C. by introduction of a coolant (liquid nitrogen in this instance) into the internal cavity of the cylinders. The lower the desired thickness for the sheet, the lower the temperature of the working surface. Thus, it is −30° C. for a 100 $\mu$m sheet and −100° C. for 70 $\mu$m.

Furthermore, it is also mentioned in this document that the lithium can be rolled between cylinders produced from a polymeric material.

The two solutions proposed involve technological improvements relating to the rolling process itself and necessitate either special arrangements such as introduction of liquefied gas into the interior of the cylinders or cylinders of special material.

SUMMARY OF THE INVENTION

The Applicants wished to find a solution in which no modification is made to the conventional rolling equipment used but in which the behaviour of the lithium is to be modified so as to avoid some or all of the precautions usually taken during the rolling operation.

Their invention consists of a process for obtaining lithium-based thin sheets, characterised in that
magnesium is added to a bath of molten lithium so as to obtain an alloy of the two metals;
the alloy is solidified;
the solid is transformed into a product having a form suitable for rolling
the product is rolled by passing it several times between steel cylinders at ambient temperature until a minimum thickness of 10 $\mu$m is attained.

Thus, the invention renders the lithium rollable under normal conditions of rolling by alloying it with magnesium. This may appear surprising, particularly since the element added is known to be poorly suited to this type of transformation.

The quantities introduced are preferably between 10 and 50 atoms per cent as smaller quantities lead to the same problems as pure lithium and larger quantities excessively affect the electrical properties of the lithium.

This alloy is prepared by conventional casting by any methods of direct metallurgy or by powder metallurgy, respecting the usual precautions taken during lithium production. It is prepared from commercially pure materials and, after solidification, the alloy obtained is put into a form suitable for rolling, preferably by extrusion or by machining, but any other conventional method of shaping can be employed.

The product is then rolled at ambient temperature between conventional steel cylinders and preferably in a dry air or argon atmosphere.

In practice, the greater the initial thickness, the higher the number of passes, but final thicknesses of about 10 $\mu$m are attained in all cases without encountering problems of adhesion.

The alloy is preferably subjected to an annealing treatment after at least one rolling pass, particularly if the initial thickness is great, as this facilitates the obtaining of thin strips without edge defects.

BRIEF DESCRIPTION OF THE DRAWING

The sole drawing Figure is a graph of capacity versus number of cycles for two sheets according to the invention.

DESCRIPTION OF THE PREFERRED EMBODIMENTS

EXAMPLE 1

Some sheets of lithium/magnesium alloys having a thickness of 20 $\mu$m are produced by adding magnesium to three baths of molten lithium under argon so as to obtain three compositions containing 50%, 30% and 10% of magnesium atoms respectively.

These alloys were cast in the form of ingots which were cut up into 30 × 30 mm samples. After mechanical cleaning of the surface of the samples in a glove box, they were cold rolled using steel cylinders.

In the case of the Li-50 Mg, no problems were observed to a thickness of 200 $\mu$m; slight dirt accumulation was noted below this thickness, but the products had a good geometric and metallic appearance: a slight tendency to creasing was observed with thicknesses below 20 $\mu$m.

In the case of the Li-30 Mg, there was no problem of adhesion and the mechanical strength of the sheet was good to 10 $\mu$m.

In the case of the Li-10 Mg, rolling could easily be carried out to 200 $\mu$m. Adhesion, then cracks within the sheet were produced below this thickness, demonstrating the need to have a sufficient quantity of magnesium.

In comparison, pure lithium behaves even worse than Li-10 Mg under identical operating conditions.

The improvement in the rollability is particularly noticeable with concentrations close to half of the maximum concentrations.

Thus, the Li-Mg alloys in which Mg >> 30% have substantially lower ductility than the alloy Li 30 Mg; those containing less than 10% of Mg behave similarly to pure lithium. The alloy Li 30 Mg therefore exhibits an excellent compromise between ductility and adhesion.

The invention also relates to the application of thin sheets obtained to the production of negative plates for accumulators.

In fact, the above-mentioned alloys which can easily be rolled to 10 $\mu$m have electrochemical properties equal to and even better than those of pure lithium.

When combined with electrolytes such as ethylene polyoxide (POE), glass (for example $B_2O_3$—X—$Li_2O$ . . .) and lithium salts (LiI, $LiClO_4$, etc. . . . ) and with current positive plates composed of $TiS_2$, $V_6O_{13}$ and the negative plates prepared from such alloys, lead to accumulators having excellent behaviour in terms of mass energy and number of cycles.

It is known, furthermore, that the use of lithium alloys can reduce the risks of dendrite formation during successive cycles in applications having a high current density.

This application can be illustrated by means of the following example:

EXAMPLE 2

It relates to accumulator installations and to the performance thereof.

Negative plates Mg Li, electrolytes: POE . . . + Li I, $LiClO_4$ . . . and positive plates $TiS_2$, $V_6O_{13}$ were assembled in a glove box by methods already employed with negative Li plates. The accumulators made up in this way had an e.m.f. of 50 mV which was lower than that of accumulators produced with pure lithium. The drop recorded can be considered as negligible relative to the mean value of the e.m.f. which is of the order 2.5 V. The mass energy was of the order of 400 kWh/kg and, in all cases, these systems were eminently suited to cycling.

The Figure shows the suitability for electrochemical cycling of a negative Li 10 Mg plate and a negative Li 30 Mg plate which are described hereinbefore and which have worked in an electrolyte containing ethylene polyoxide and $LiClO_4$.

It is noted that the capacity had not varied after 40 cycles.

To conclude, the process forming the subject of the invention allows alloys having the following advantages over pure lithium to be obtained:
Increased rollability:
  possibility of using metal cylinders
  high reduction ratio and hence reduction in the number of passes
  better surface finish
  easy rolling without subsequent adhesion
  low production cost.
Less significant reactivity:
  easy storage
  reduced risk of fire.

With regard to use as negative plates of accumulators, the following advantages can be mentioned:
easy handling leading to increased facility of production
greatly reduced risk of dendrite formation and hence use of short recharge times, high currents and a larger number of cycles
increased safety of use.

We claim:
1. Process for obtaining lithium-based thin sheets, comprising the steps of:
   adding magnesium to a bath of molten lithium to obtain a lithium-magnesium alloy containing 10 to 30 atom % magnesium;
   transforming the alloy into a solid product in a form suitable for rolling; and
   rolling the solid product by passing it a plurality of times between steel cylinders at ambient temperature to obtain a sheet of thickness between 10 and 200 $\mu$m.
2. Process according to claim 1, wherein the alloy is subjected to an annealing treatment after at least one rolling pass.
3. Process according to claim 1, wherein the rolling is carried out in dry air.
4. Process according to claim 1, wherein the rolling is carried out in dry argon.
5. Process according to claim 1, wherein said thin sheets are negative plates for accumulators.

* * * * *